US007327750B2

(12) United States Patent
Kuwajima et al.

(10) Patent No.: US 7,327,750 B2
(45) Date of Patent: Feb. 5, 2008

(54) RECEIVING APPARATUS BASED ON COMMUNICATIONS PROTOCOL

(75) Inventors: Hidenori Kuwajima, Tenri (JP); Toshio Matsumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1053 days.

(21) Appl. No.: 10/171,622

(22) Filed: Jun. 17, 2002

(65) Prior Publication Data

US 2002/0191629 A1 Dec. 19, 2002

(30) Foreign Application Priority Data

Jun. 15, 2001 (JP) ............... P2001-182321

(51) Int. Cl.
*H04L 12/54* (2006.01)
*G06F 1/04* (2006.01)
*H03M 13/00* (2006.01)

(52) U.S. Cl. ............... 370/428; 713/600; 714/775

(58) Field of Classification Search ............... 370/296, 370/466, 428, 412, 465, 242, 243, 246, 395, 370/338, 445, 536, 255, 232, 235, 237, 252, 370/516, 352, 401, 538, 540, 535, 503; 375/225, 375/253, 224, 252, 211, 247; 709/209, 236, 709/220, 203; 455/41, 407, 18; 710/71, 710/22; 711/103; 714/775, 781; 713/320, 713/600, 400, 401, 500–503; 379/114.01, 379/56

See application file for complete search history.

(56) References Cited

U.S. PATENT DOCUMENTS

| 4,463,351 | A | * | 7/1984 | Chiarottino ............... 370/445 |
| 5,111,461 | A | * | 5/1992 | Miyazaki ............... 714/775 |
| 5,404,449 | A | * | 4/1995 | Weber et al. ............... 710/71 |
| 5,506,965 | A | * | 4/1996 | Naoe ............... 709/209 |
| 6,728,271 | B1 | * | 4/2004 | Kawamura et al. ......... 370/536 |
| 7,000,129 | B2 | * | 2/2006 | Sekine et al. ............... 713/320 |
| 2002/0026543 | A1 | * | 2/2002 | Tojima et al. ............... 710/22 |
| 2002/0075836 | A1 | * | 6/2002 | Uematsu ............... 370/338 |
| 2002/0177411 | A1 | * | 11/2002 | Yajima et al. ............... 455/41 |
| 2003/0046599 | A1 | * | 3/2003 | Takamiya et al. .......... 713/600 |
| 2004/0177215 | A1 | * | 9/2004 | Nagamasa et al. .......... 711/103 |

FOREIGN PATENT DOCUMENTS

JP 2000-232461 8/2000

\* cited by examiner

*Primary Examiner*—Wing Chan
*Assistant Examiner*—Prenell Jones
(74) *Attorney, Agent, or Firm*—Nixon & Vanderhye, PC

(57) ABSTRACT

An example receiving apparatus includes a reception clock controlling section for controlling clock supply to the components thereof. A reception section receives a communication packet transmitted from a destination and a received packet analyzing section judges whether or not the received packet is correct and analyzing the received packet. A reception memory section stores the received packet of any packet type and a reception registering section stores the received packet until a clock is supplied to the reception memory section. A received data outputting section outputs the received packet stored in the reception registering section and the reception memory section to a host CPU.

16 Claims, 6 Drawing Sheets

RECEIVING APPARATUS BASED ON COMMUNICATIONS PROTOCOL

BACKGROUND OF THE INVENTION

1. Field of the Invention

The present invention relates to a receiving apparatus according to a communications protocol employing a packet scheme in an information processor such as a computer.

2. Description of the Related Art

FIG. 3 is a view showing a constitution of an example of packet format communication data which is received by a receiving apparatus, which is a fundamental unit of communication and shows an example of a packet used in Bluetooth. The packet is composed of an address part 51 comprising an access code, a header part 52 including packet type information, a payload part 53 comprising communication data information and an effective flag part 54 including information for judging whether or not the packet is effective. The packet is orderly comprised of the address part 51, the header part 52, the payload part 53 and the effective flag part 54 and the address part 51, the header part 52, the payload part 53 and the effective flag part 54 are consecutively communicated from the left bit (the access code) one by one.

Further, there exist packets composed of the address part 51 only, and of the address part 51 and the header part 52 in some packet types.

The address part 51 has information for specifying a destination in an environment where one or more destinations can exist. The packet type information included in the header part 52 represents the type of packet itself. As a gist of the present technology, since the header part 52 is explained covering only the packet type information included, the header part is called "a type part" in the explanation thereafter. The payload part 53 is composed of communication data for practically communicating between the mutual telecommunications apparatuses. The initial 1 or 2 bytes is called a payload header where the packet size information (length field) is included. The effective flag part 54 has information for judging whether or not any error occurs in the communication data (from the type to the payload parts) by noise, etc. when communicating.

FIG. 5 is a block diagram of a configuration of a conventional receiving apparatus. The receiving apparatus 101 is represented by a receiving apparatus disclosed in Specification of Japanese Examined Patent Publication JP-B1 3070595 and a typical one in the communications protocol of packet scheme. The receiving apparatus 101 performs a receiving operation by receiving an instruction for controlling reception from a host CPU 102. When receiving the packet, or the communication data, from a destination 103, the receiving apparatus 101 stores the necessary communication data in the receiving apparatus by judging whether or not the packet was properly received. Then, when receiving an instruction for reading the received data from the host CPU 102, the receiving apparatus has a function for outputting the received data to the host CPU 102.

The receiving apparatus 101 comprises reception clock controlling means 104 having a control function for starting or stopping clock supply to each means in the receiving apparatus 101 described later, reception means 105 for receiving the external packet data, received packet analyzing means 106 for analyzing the received packet, reception memory means 107 for stopping clock supply while the receiving apparatus is not receiving and for having a capacity that can store a plurality of received packets and received data outputting means 108 for outputting the received packet from the reception memory means 107 to the host CPU 102 when accepting an instruction to read the received packet from the host CPU 102.

The reception means 105 is equal to a physical layer in a so-called communication industry (e.g.; a physical layer typified by RF module, etc. in a radio system) and an interface.

The received packet analyzing means 106 is comprised of a received address judging means 110 for judging whether or not the received packet is transmitted to the target receiving apparatus, a received header judging means 111 for judging the packet type of received packet and a reception effective flag judging means 112 for judging whether or not the received packet based on the effective flag in the received packet is effective.

The reception memory means 107 is generally comprised of memory such as SRAM, for the capacity reason, not a register group comprised of so-called IC logic gates. The reception memory means 107 also has a function not only as so-called memory but also for managing information of received data capacity stored in memory. The management information managed by the reception memory means 107 can be read from the host CPU 102 via the received data outputting means 108.

FIG. 6 is a flow chart showing a receiving operation in the receiving apparatus 101 of FIG. 5.

In the receiving apparatus 101, by that the host CPU 102 instructs to start receiving data, the reception clock controlling means 104 controls a reception controlling clock 123 to supply the reception means 105 with a clock and the reception means 105 starts receiving the communication data transmitted from the destination 103. In a step s21, the reception clock controlling means 104 starts clock supply to each means in the receiving apparatus 101. In step 22, the reception data received by the reception means 105 is passed to the received packet analyzing means 106 via an internal received data bus 124.

In the received packet analyzing means 106, in step s23, the address part of the packet that the received address judging means 110 received is firstly extracted and whether or not the received data is transmitted to the particular receiving apparatus 101 according to the extracted address section is judged. When the packet is judged as being destined for the particular receiving apparatus 101, in step s24, the received header judging means 111 analyzes the type part so as to judge whether or not the packet is received. When the packet is judged as being a packet to be received, in step s25, the received packet is stored in the reception memory means 107 via the internal received data bus 124. After storing the packet, in step s26, the reception effective flag judging means 112 analyzes the effective flag of the received and stored packet so as to judge whether or not there is any error in the packet.

In step s26, in the case that it is judged that the proper payload could not be received by occurring troubles caused by noise, etc. when communicating, the payload stored in the reception memory means 107 is abandoned in step s27. After abandoning or the packet is judged as including no error in step s26 and the reception packet is completely received, in the case that the receiving apparatus does not receive other data, the reception clock controlling means 104 controls the reception controlling clock 123 to stop clock supply to the reception means 105 so as to stop reception as in the case of step s28 and stops clock supply to each means. Thus, electric power consumption is reduced and the packet reception is terminated. Accordingly, it can be said that communication was established by judging that the proper payload could be received in step s26.

Further, in step s23, when the receiving apparatus can not extract the address part for a certain period or the receiving apparatus judged as having received the packet which is not destined for the receiving apparatus, or in step s24, when the receiving apparatus is judged as having received the packet which is not of a type of packet to be received and communication is not established like a case that the receiving apparatus does not perform the receiving operation so far, at that time, processing is shifted to step s28 and the packet reception is terminated as mentioned above.

The packet stored in the reception memory means 107 is output to the host CPU 102 when the host CPU 102 issues the instruction for reading the received data to the receiving apparatus 101. Specifically, when the host CPU 102 outputs a request signal for reading the received data to the received data outputting means 108, the received data outputting means 108 outputs the received data stored in the reception memory means 107 to the host CPU 102 via the internal received data bus 125.

Regardless of the normal or abnormal reception situation, that is, whether or not communication was established, the conventional receiving apparatus as mentioned above starts clock supply to each means from the time of starting reception. At the time to completely receive the packet, the conventional receiving apparatus stops clock supply to each means, resulting in reduction in power consumption. Accordingly, when starting reception, a clock is also supplied to the reception memory means 107. The reception memory means 107 has not only memory but also a control circuit such as an address pointer as mentioned above. Depending on the capacity of reception memory itself, the circuit relative to the whole receiving apparatus is generally large in scale. That is, clock supply to the reception memory means 107 is directly connected with a magnitude increase in electric current consumption of the receiving apparatus 101.

Here is considered a situation before establishing communication between the mutual communication apparatuses of the destination 103 and the receiving apparatus 101. Under this situation that it is unclear when the receiving apparatus receives the communication data, the receiving apparatus 101 should periodically receive the communication data since the destination 103 might transmit the communication data. That indicates a so-called standby time for cellular telephones. In this case, in order to receive the packet that is unclear when the packet is transmitted, the host CPU 102 instructs the receiving apparatus 101 to periodically perform the receiving operation. There may be also a case where the means that can set to periodically start the receiving operation is given to the receiving apparatus 101 itself.

In consideration of such situation before establishing such communication, non-communicating time (standby time) is commandingly long with respect to the time when communication is established and the receiving operation is performed (an exchanging time of the communication data). Clock supply to the reception memory means 107 every time before establishing communication results in a large consumption of unnecessary current and a problem of electrical power consumption.

SUMMARY OF THE INVENTION

An object of the invention is to consume a lower amount of current from starting to establishing communication in a receiving apparatus for communicating according to a communications protocol.

The invention provides a receiving apparatus based on a communications protocol, for receiving and storing a communication packet transmitted from a destination and outputting the stored packet to a host CPU, comprising:

reception means for receiving a communication packet transmitted from the destination;

received packet analyzing means for analyzing the received packet;

reception memory means for storing the received packet;

reception registering means capable of storing a packet received by a time when a clock is supplied to the reception memory means;

received data outputting means for outputting the received packet stored in the reception registering means and the reception memory means to the host CPU; and reception clock controlling means for controlling clock supply to each means in the receiving apparatus, wherein the reception clock controlling means controls that clock supply to the reception memory means can be stopped even while receiving.

According to the invention, in storing a packet received based on the communications protocol, into the reception memory means, when communication is established in such a manner that the reception clock controlling means supplies a clock to function blocks except the reception memory means in the receiving apparatus, the packet received after starting communication is stored in the reception registering means, and the stored packet is judged as being correct by the received packet analyzing means, the reception clock controlling means supplies a clock to the reception memory means and a packet subsequently received is allowed to be stored in the reception memory means. Thereby, even if communication is started and a packet is received, since clock supply to the reception memory means having a large-scale circuit in the receiving apparatus is not allowed until the packet is properly received so as to establish communication, power consumption can be substantially reduced as compared with the case where clock supply to the reception memory means is carried out at a time when the packet is received.

In the invention, it is preferable that the received packet analyzing means comprises received address judging means for judging whether or not the received packet is destined for the particular receiving apparatus, received header judging means for judging a packet type of the received packet and reception effective flag judging means for judging whether or not the received packet is effective based on an effective flag in the received packet.

According to the invention, the received packet analyzing means can judge that communication has been surely established if the received address judging means judges that the received packet is destined for the particular receiving apparatus, the received header judging means judges that the received packet is a packet type to be received and the reception effective flag judging means judges that the received packet is effective. Thereby, only at the time that communication has been surely established, a clock is supplied to the reception memory means, and it can evade that a clock is supplied to the reception memory means by misjudging that communication has been established, so that current consumption can be reduced.

In the invention, it is preferable that the reception registering means has a capacity to store only one received packet of a specific packet type and the reception clock controlling means starts clock supply to the reception memory means when the packet received by the reception means is judged as being destined for the particular receiving apparatus by the received address judging means, to be the specific packet type by the received header judging means and to be an effective packet by the reception effective flag judging means.

According to the invention, in storing a packet received based on the communications protocol, into the reception memory means, clock supply to the reception memory means is carried out when communication is established in such a manner that reception clock controlling means supplies a clock to function blocks except the reception memory means in the receiving apparatus, the packet received after starting communication is stored in the reception registering means in cases where the packet is judged as being destined to the particular receiving apparatus by the received address judging means of the received packet analyzing means, and as being a specific packet transmitted at a time when communication is started, by the received header judging means, and the packet is judged as being effective by the reception effective flag judging means. When communication is thus established, a clock is supplied to the reception memory means and a packet subsequently received is allowed to be stored in the reception memory means. Thereby, even if communication is started and a packet is received, since clock supply to the reception memory means having a large-scale circuit in the receiving apparatus is not allowed until communication is established after the received packet is judged as being a specific packet transmitted at a time when communication is started, as being destined for the particular receiving apparatus and being effective, power consumption can be substantially reduced as compared with the case where clock supply to the reception memory means is carried out at a time when the packet is received.

In the invention, it is preferable that the reception registering means has a capacity to store a plurality of received packets of any packet type, and the reception clock controlling means starts clock supply to the reception memory means when the packet received by the reception means is judged by the received address judging means as being destined for the particular receiving apparatus, by the type judging means as being of a packet type in which packet a payload or actual data exists, and by the reception effective flag judging means as being an effective packet.

According to the invention, in storing the packet containing received based on communications protocol, the reception clock controlling means supplies a clock to the respective function blocks except the reception memory means, and the packet received after starting communication is judged as being destined for the particular receiving apparatus by the received address judging means of the received packet analyzing means, as being a specific packet by the received header judging means and stored in the reception registering means. Thereafter the stored packet is judged as being effective by the reception effective flag judging means and communication is established. Some packets without payload data successively received also are stored in the reception registering means. When the some packets are judged as being packets containing payload data by the received header judging means, a clock is supplied to the reception memory means and the packets containing payload data can be successively stored in the reception memory means. Thereby, even if a packet received after starting communication is judged as being a specific packet transmitted at a time of starting communication, as being destined for the particular receiving apparatus and as being effective and communication is established, since clock supply to the reception memory means having a large-scale circuit in the receiving apparatus can not allowed until another packet with payload data is received. As compared with the case that a clock is supplied to the reception memory means at a time when the packet is received, electrical power consumption can be significantly reduced.

In the invention, it is preferable that the received data outputting means outputs the received packet stored in the reception registering means or the reception memory means when the host CPU requests to read the received packet stored in the received register means or the reception memory means.

According to the invention, when the host CPU requests the received data outputting means to read the received packet, the reception clock controlling means supplies a clock to the reception registering means or the reception memory means. Since the reception clock controlling means can output the received packet stored therein to the host CPU, the reception clock controlling means supplies a clock to the means, or necessary function block, as necessary also when outputting the received data, so that electric power consumption can be reduced.

According to the invention, in a receiving apparatus for storing the packet received based on the communications protocol in the reception memory means, the reception clock controlling means does not supply a clock to the reception memory means until communication is established and the received packet is stored in the reception registering means. When the packet is judged as being correct by the received packet analyzing means and communication is established, the reception clock controlling means supplies a clock to the reception memory means. By storing the subsequently received packet in the reception memory means, even if the packet is received by establishing communication, since the reception clock controlling means can stop supplying a clock to the reception memory means having large-scale circuit in the receiving apparatus until the packet is properly received and communication is established, comparing with the case that the reception memory controlling means supplies a clock to the reception memory means in the stage that the packet was received, electrical power consumption can be substantially reduced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
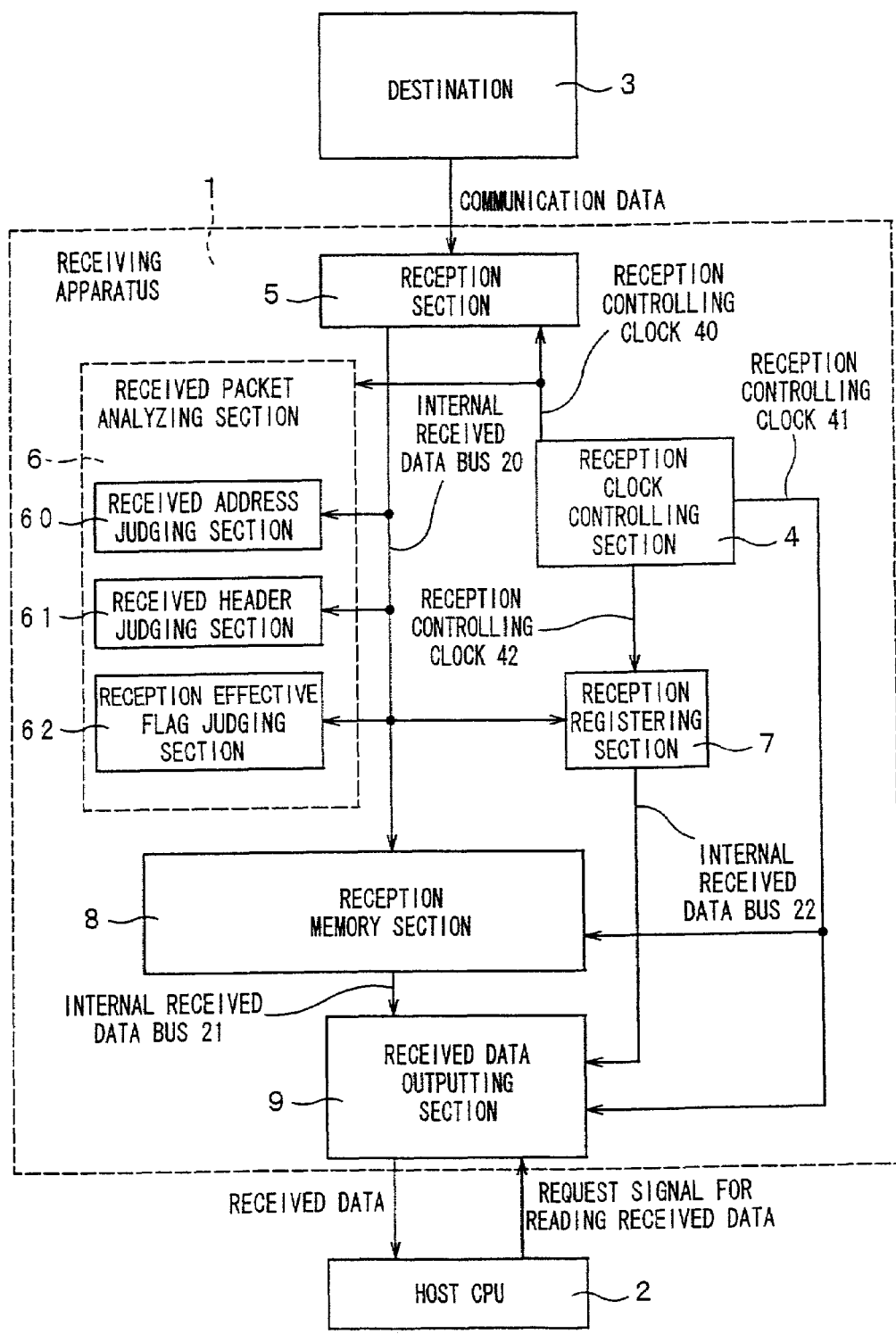
FIG. 1 is a block diagram showing a configuration of a receiving apparatus according to a first embodiment of the invention.

Now referring to the drawings, preferred embodiments of the invention are described below.

Figure 3:
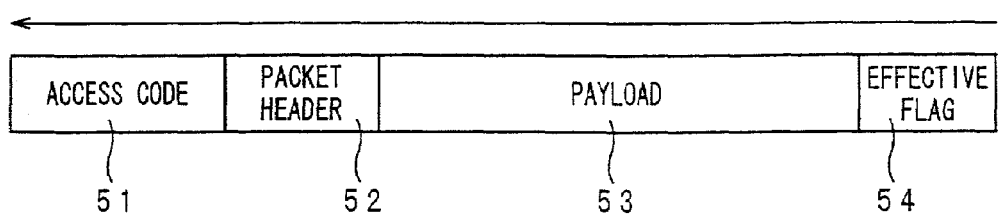
FIG. 3 is a view showing a constitution of an example of a packet format of received communication data in the receiving apparatus.
Figure 5:
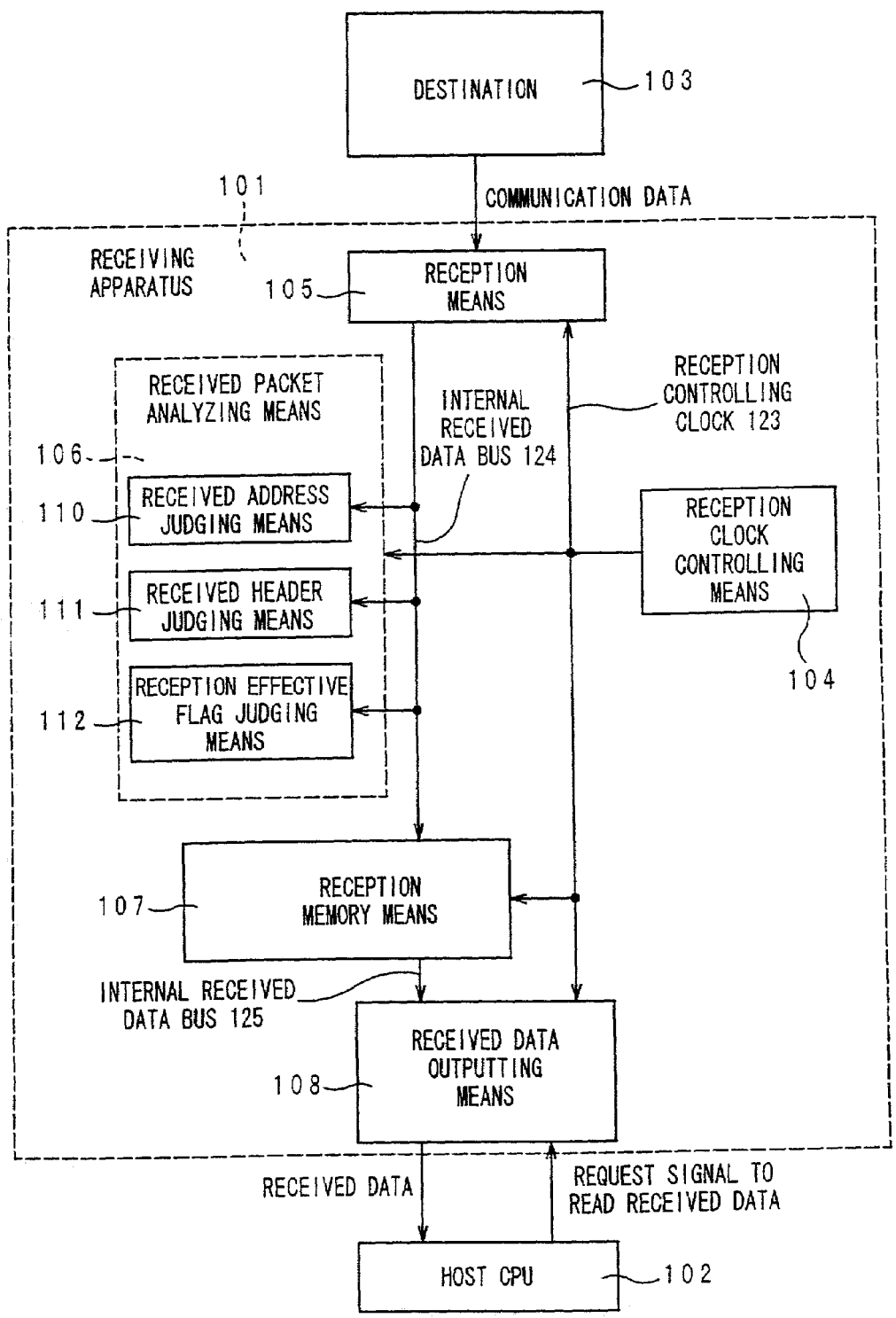
FIG. 5 is a block diagram showing the configuration of a conventional receiving apparatus.
Figure 6:
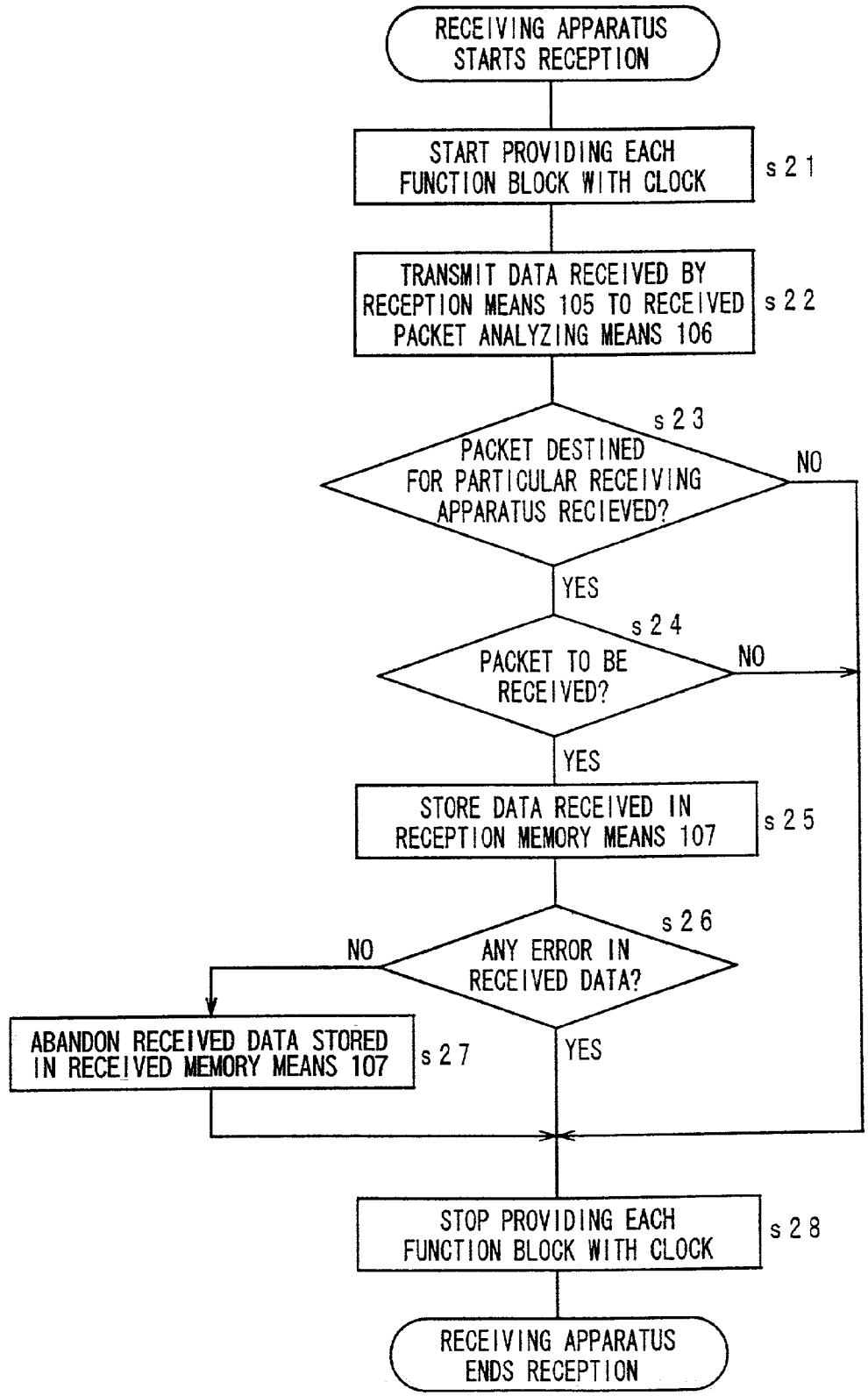
FIG. 6 is a flow chart showing receiving operations in the receiving apparatus of FIG. 5.

FIG. 1 is a block diagram showing the configuration of a receiving apparatus according to a first embodiment of the invention. The receiving apparatus 1 is predicted to perform the receiving operation according to a standard, or a communications protocol called a packet scheme as in the case of a conventional receiving apparatus 101 shown in FIG. 5, and called Bluetooth for wireless connection. Accordingly, a connection relation among the receiving apparatus, the host CPU 102 for controlling the receiving apparatus 1 and the destination 3, or a transmitter is the same as that of the receiving apparatus 101. Here is omitted the detailed explanation of the packet, or a fundamental unit of communication used in the communications protocol since the packet is the same as the packet shown in FIG. 3.

The receiving apparatus 1 comprises reception clock controlling section 4 as reception clock controlling means having a control function for starting or stopping clock supply to each section described later in the receiving apparatus 1, a reception section 5 as reception means for receiving a packet, or communication data transmitted from the destination, a received packet analyzing section 6 as received packet analyzing means for analyzing the received packet, a reception registering section 7 as reception registering means having a capacity that only one received packet (fixed-length FHS packet) of specific packet type, a reception memory section 8 as reception memory means that clock supply is controlled to stop even while receiving and has a high-capacity that a plurality of received packets of optional packet type can be stored and a received data outputting section 9 as received data outputting means for outputting the received packet stored in the reception registering section 7 or the reception memory section 8 when the host CPU 102 requests the receiving apparatus 1 to read the received packet stored.

The received packet analyzing section 6 comprises a received address judging section 60 as received address judging means for judging whether or not the received packet is destined for the particular receiving apparatus, a received header judging section 61 as received header judging means for judging the packet type of the received packet and a reception effective flag judging section 62 as reception effective flag judging means for judging whether or not the packet received based on the effective flag in the received packet is effective.

The reception section 5 is equal to a physical layer in a so-called communication industry (e.g. a physical layer typified by RF module, etc. in a radio system) and an interface.

The reception memory section 8 is generally comprised of memory such as SRAM, for capacity reason, not a register group comprised by so-called IC logic gates. The reception memory section 8 has a function not only as so-called memory but also for managing information of received data capacity stored in memory. The management information managed by the reception memory section 8 can be read from the host CPU 102 via the received data outputting means 9.

According to Bluetooth, or the communications protocol, transiting each step called a state, the receiving apparatus 1 configured thus performs the receiving operation. Firstly, each state and a packet to be transmitted and received between mutual apparatuses in each state are explained. The detailed explanation for a transmitting end is omitted as a matter necessary for explanation of the receiving end.

In Bluetooth, or the communications protocol, with which the receiving apparatus 1 complies as mentioned before, a situation that communication is not established is called a STANDBY state and a situation that communication is established is called a CONNECTION state. Under the condition that nothing is communicated and communication between the receiving apparatus 1 and the destination 3 is not established, therefore, the receiving apparatus 1 is in the state called the STANDBY. In the STANDBY state, the reception clock controlling section 4 controls to stop clock supply to the whole receiving apparatus 1 via the reception controlling clocks 40 to 42.

This prevents from consuming power caused by clock oscillation to each section when not communicating. The receiving apparatus 1, however, is necessary to make attempts of reception at regular intervals since it is unsure when the communication data is actually transmitted from the destination 3 as stated before. The time to make attempts of reception at regular intervals is defined as "waiting mode".

Under the waiting mode, the receiving apparatus 1 is set that the host CPU 2 directly instructs the receiving apparatus 1 to start reception at regular intervals as a trigger for starting reception. There can be set a means for automatically starting reception with a counter, etc. in the receiving apparatus 1 after a lapse of regular intervals. In this case, it is necessary to set an additional means for supplying a clock to the receiving apparatus 1. In Bluetooth, a state for starting reception in order that the receiving apparatus establishes communication is called PAGE SCAN.

On the other hand, in order to establish to communicate with the receiving apparatus 1 while performing PAGE SCAN, the destination 3, or the communication apparatus of the transmitting end, enters a state called PAGE in Bluetooth. In order to transit to the state called PAGE, the destination 3 is necessary to acquire unique address information of the receiving apparatus 1 in advance. Bluetooth defines that each communication apparatus has the unique address information.

The destination 3 in the PAGE state transmits the packet composed of only the address information preset for the receiving apparatus 1 at intervals stipulated by the protocol. The packet composed of only the address information is called an ID packet. When the receiving apparatus 1 in the PAGE SCAN state can properly receive the ID packet transmitted from the destination 3 in the PAGE state, the receiving apparatus 1 transits to a SLAVE RESPONSE state and transmits back the ID packet in the form to respond to transmission from the destination 3 after the fixed time. The destination 3 starts reception, timing that the ID packet will be transmitted back from the receiving apparatus 1. The timing is defined in the communications protocol.

In order to perform the first step for establishing communication, on the precondition that these communication apparatuses are in the range to reach radio waves each other between mutual communication apparatuses in the destination 3 and the receiving apparatus 1, it is additionally necessary that the destination 3 enters the PAGE state and the receiving apparatus 1 enters the PAGE SCAN state. In Bluetooth, the different frequency used in mutual transmission and reception cannot properly perform communication because of communicating in the spread spectrum system of frequency hopping type. Further, radio wave may occur reception difficulty caused by communication noise, etc. so that the transmitted data may not be received properly.

As mentioned already, when the ID packet that the receiving apparatus 1 which transited to the SLAVE RESPONSE state transmitted back properly reaches the destination 3, a packet called FHS is transmitted from the destination 3. The FHS packet is a packet type defined in the communications protocol and has all of the address, the type, the payload and the effective flag parts. Further, Bluetooth defines that the ID packet properly reaches the destination 3 as a MASTER RESPONSE state.

In Bluetooth, when the receiving apparatus 1 properly receives the FHS packet, the receiving apparatus 1 retransmits the ID packet to the destination 3. Further, in the case that the receiving apparatus 1 cannot properly receive the FHS packet for a fixed period of time, the receiving apparatus 1 transits again to the PAGE SCAN state waiting for the ID packet. When the destination 3 can properly receive the ID packet, the destination 3 transits to the CONNECTION state and transmits the packet called a POLL packet to the receiving apparatus 1. The POLL packet comprises the address and the type parts, not including the payload part and is a packet for establishing communication like the ID packet. When the receiving apparatus 1 receives the POLL packet transmitted from the destination 3, the receiving apparatus 1 can transit to the CONNECTION state and, at this time, communication has been established. Bluetooth stipulates that the destination 3 transmits the packet included the payload part, or the actual communication data, after receiving the POLL packet.

Next, by transmitting and receiving each packet in each state as mentioned above, the receiving operation in the receiving apparatus 1 is described.

Figure 2:
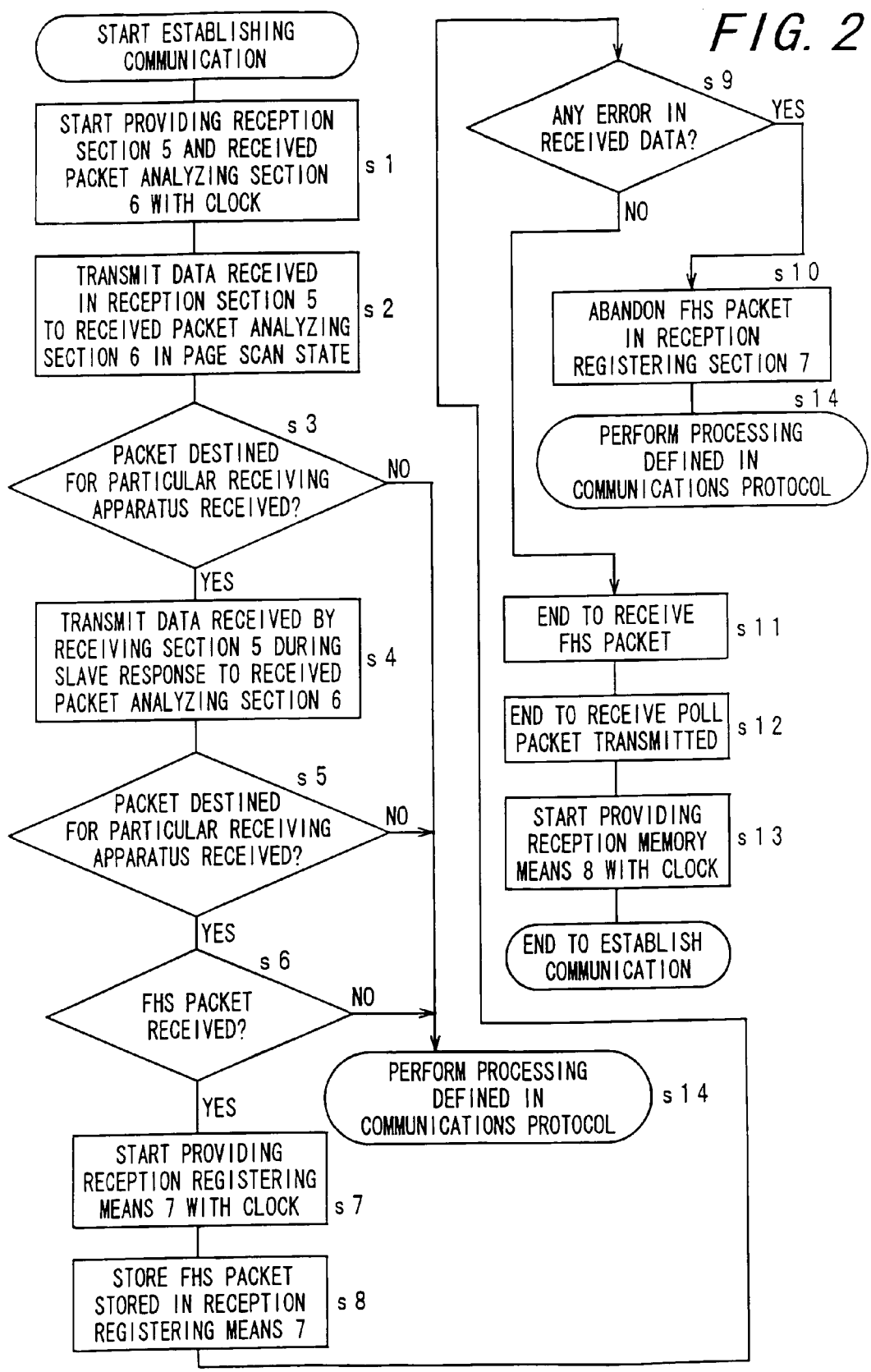
FIG. 2 is a flow chart showing a receiving operation in the receiving apparatus of FIG. 1.

FIG. 2 is a flow chart showing receiving operations in the receiving apparatus 1 of FIG. 1.

When the receiving apparatus 1 in the STANDBY state is instructed to start receiving data by the host CPU 2 and transits to the PAGE SCAN state so as to start the receiving operation, in step s1, the reception clock controlling section 4 controls the reception controlling clock 40 to start clock supply to the reception section 5 and the received packet analyzing section 6. As mentioned above, at the first step for establishing communication, since the receiving apparatus 1 may not be able to easily and properly receive the transmission data, the possibility that the receiving apparatus 1 can receive the data transmitted just after step s1 is extremely remote. Therefore, the reception clock controlling section 4 in the receiving apparatus 1 in the PAGE SCAN state controls the reception controlling clock 41 to stop clock supply to the reception memory section 8 and the received data outputting section 9. The reception clock controlling section 4 also controls the reception controlling clock 42 to stop clock supply to the reception registering section 7. In particular, stop of clock supply to the reception memory section 8 having large-scale circuit in the whole receiving apparatus is very important for saving current consumption.

Next, in step s2, the reception data received by the reception section 5 in the PAGE SCAN state is passed to the received packet analyzing section 6 via the internal reception data bus 20. As stated already, in the case that the destination 3 is in the PAGE state, the ID packet composed of only the address part for establishing communication is transmitted. In step s3, the received packet analyzing section 6 extracts the address part of the received ID packet, and after extracting, the received address judging section 60 judges whether or not the received data is destined for the particular receiving apparatus 1. As stated already, in the case that the destination 3 does not transmit (not in the PAGE state) the ID packet, the address part cannot be detected. Even in the case that the destination 3 is in the PAGE state transmitting to the receiving apparatus 1, it is a requirement that the frequency of transmitting is the identical to that of receiving and there is no error in the received data. Accordingly, in the case that the receiving apparatus 1 judges that the receiving apparatus 1 could not receive the ID packet transmitted to the receiving apparatus 1 for some reasons during the PAGE SCAN interval defined in the communications protocol, in step s14, as defined in the communications protocol, the reception operation is stopped and the reception controlling clocks 40 to 42 are controlled until the following PAGE SCAN is performed, and then clock supply to the whole receiving apparatus 1 is stopped. The communications protocol defines also the interval until PAGE SCAN is performed again.

In step s3, on the other hand, when the received address judging section 60 while performing PAGE SCAN judges that the ID packet destined for the particular receiving apparatus could be received, the receiving apparatus 1 transits to the SLAVE RESPONSE state and transmits back the ID packet to the destination 3 as stated already. Also, as mentioned above, when the ID packet transmitted back properly reaches the destination 3, the FHS packet is transmitted from the destination 3. The receiving apparatus 1 in the SLAVE RESPONSE state receives the packet until the receiving apparatus 1 can receive the packet destined for the particular receiving apparatus 1 during the period that the communications protocol defines to perform the receiving operation of the FHS packet.

Even if the case that the receiving apparatus judges that the ID packet destined for the particular receiving apparatus, the ID packet has no communication data for actually exchanging between the mutual communication apparatuses, that is, the ID packet has no payload data that the host CPU 2 should read as a reception data and it is unnecessary to store the reception data in reception registering section 7 and the reception memory section 8. Accordingly, even the stage that the ID packet could be received, controlling the reception controlling clock 41 and stopping clock supply to the reception memory section 8 and the received data outputting section 9 allow to substantially reduce power consumption, comparing with the case that a clock is supplied to the reception memory section 8 having large-scale circuit.

Next, in step s4, the reception data received by the reception section 5 during the SLAVE RESPONSE state is passed to the received packet analyzing section 6 via the internal received data bus 20. In the received packet analyzing section 6, the address part of the received packet is extracted, and after extracting, in step s5, the received address judging section 60 judges whether or not the received data is destined for the particular receiving apparatus 1. When the received data is judged as being a packet to be destined for the particular receiving apparatus, in step s6, the received header judging section 61 analyzes the packet and judges whether or not the FHS packet, or the packet type defined in the communications protocol, is received. Further, in the case that it is judged that the packet destined for the particular receiving apparatus could not be received in step s5 or that the FHS packet could not be received 1 in step s6, the operation defined in the communications protocol is performed in step s14, as the case where the receiving apparatus judged that the ID packet destined for the particular receiving apparatus could not be received in step s3.

Next, when it is judged that the FHS packet could be received, in step s7, the received clock controlling section 4 controls the reception controlling clock 42 to supply a clock to the reception registering section 7. In step s8, the reception registering section 7 supplied with the clock stores the received FHS packet. Further, the reception controlling clock 42 can start clock supply to the reception registering section 7 by triggering that the ID packet was received. That is, timing of clock supply to the reception registering section 7 can be provided between the point when the receiving apparatus judged that the ID packet could be received in step s3 and the point when the FHS packet is received in the reception registering section 7 in step s8. From a view of unnecessary electric power consumption, however, it is preferable to supply a clock to the reception registering section 7 after judging that the FHS could be received.

Next, in order to check whether or not the packet data of the received and stored FHS packet is damaged by the communication noise, etc., in step s9, the effective flag part is analyzed and the reception effective flag judging section 623 judges whether or not there is any error in the received FHS packet. In the case that errors are extracted in the received FHS packet, in step s10, the FHS packet stored in the reception registering section 7 is abandoned and, in step s14, the operation is performed processing defined in the communications protocol. On the other hand, in the case that there is no reception error caused by the communication noise, etc., in step s11, the reception of FHS packet is terminated. As mentioned above, when the receiving apparatus 1 properly receives the FHS packet, the receiving apparatus 1 retransmits the ID packet to the destination 3. The destination 3 which properly received the ID packet transmitted transits to the CONNECTION state and transmits the POLL packet to the receiving apparatus 1.

Next, in step s12, when the receiving apparatus 1 receives the POLL packet transmitted from the destination 3, the receiving apparatus 1 transits to the CONNECTION state and communication is established. In step s13, at the time when communication was established by receiving the POLL packet, the reception clock controlling section 4 controls the reception controlling clock 41 to start clock supply to the reception memory section 8 and the received data outputting section 9.

Further, Bluetooth defines that the first packet just after the receiving end transited to the CONNECTION state transmits the POLL packet, but actually, the receiving apparatus 1 can receive not only the POLL packet but also a packet where the reception data included the payload to be exchanged exists. The receiving apparatus 1, therefore, may be designed so as to receive a packet containing the payload other than the POLL packet, although it is not defined in Bluetooth. In this case, however, when the FHS packet could be received in step s11, it is necessary that the reception controlling clock 41 is controlled to start clock supply to the reception memory section 8 and the received data outputting section 9.

Next, since the receiving apparatus 1 receives the packet included the payload part to be transmitted from following the POLL packet as stated already, also after establishing communication, the packet is judged as being a proper packet to be received by the received packet analyzing section 6 at receiving time. The proper reception packet except the packet for keeping communication synchronization is directly stored in the reception memory section 8, not in the reception registering section 7. Accordingly, after establishing communication, the reception clock controlling section 4 may control the reception controlling clock 42 to stop clock supply to the reception registering section 7.

After storing the received data in the reception memory section 8, when the host CPU 2 instructs the receiving apparatus 1 to read the received data, the reception memory section 8 outputs the received data stored in the reception memory section 8 to the host CPU 2 via the internal received data bus 21 and the received data outputting section 9. This operation allows the host CPU 2 to obtain the communication data that the receiving apparatus 1 received. Instead of the instruction to read the received data, the information to notify that a given amount of reception is exceeded in the reception memory section 8 may be transmitted to the host CPU 2.

Further, as stated already, since the FHS packet, as is the received data stored in the reception memory section 8, is stored also in the reception registering section 7, the host CPU 2 may read the FHS packet. In this case, the FHS packet data is output to the host CPU 2 via the internal received data bus 22 and the received data outputting section 9.

As mentioned above, in the receiving apparatus 1 according to the embodiment, at the moment when communication is established or the FHS packet could be properly received at the earliest, the reception clock controlling section 4 controls the reception controlling clock 41 to start clock supply to the reception memory section 8 and the received data outputting section 9. This allows power consumption to be substantially reduced, comparing with the case that a clock is supplied to the reception memory means after receiving the ID packet prior to establishing communication. The reasons are as follows:

A difference between the ID packet and the FHS packet is described. The ID packet is a packet having the address part only, whereas the FHS packet is a packet having all of the address, the type, payload and the effective flag parts so that the FHS packet has a large amount of reception data. This means the possibility to mix communication noises, etc. markedly increases, comparing with the ID packet. That is, under the communicating condition that a packet having as much data as the FHS packet can not be properly received due to communication noises, etc. although the ID packet can be properly received by any means, failure of FHS packet reception frequently occurs and step s10 may be repeated. Accordingly, at that point, it is useless to supply a clock to the reception memory section 8 and the received data outputting section 9.

Figure 4:
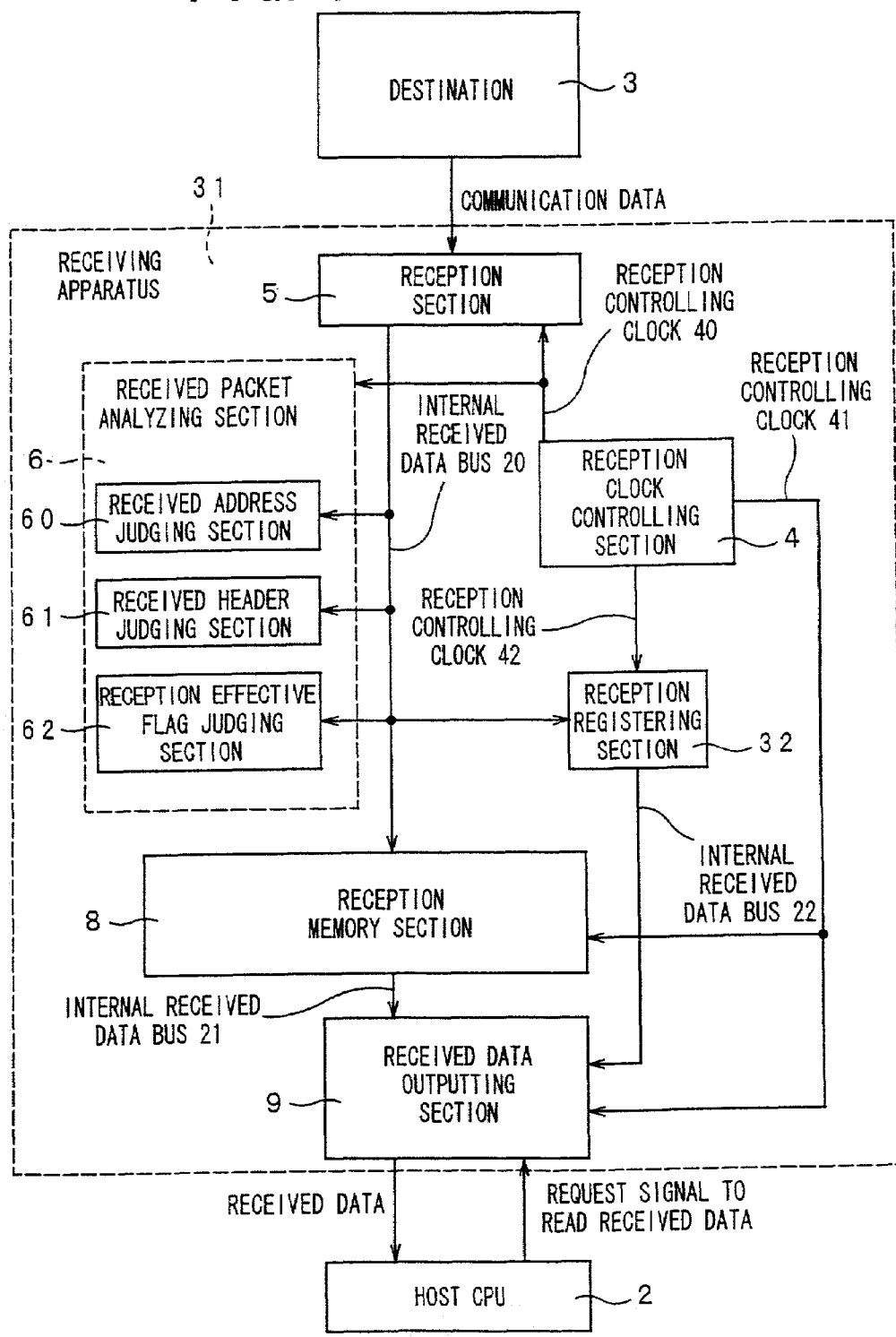
FIG. 4 is a block diagram showing the configuration of a receiving apparatus according to a second embodiment of the invention.

Next, the receiving apparatus 31 and its reception operation according to a second embodiment of the invention is explained. FIG. 4 is a block diagram showing the configuration of a receiving apparatus 31 according to a second embodiment of the invention.

The receiving apparatus 31 according to the second embodiment of the invention is similar to the configuration of the receiving apparatus 1 in a first embodiment of the invention according to Bluetooth standard, whereas it is remarkable that the receiving apparatus 31 has the different data capacity that can be stored in the reception registering section 32. That is, the reception registering section 7 in the receiving apparatus 1 of the first embodiment of the invention is set a capacity that a single FHS packet, or the specific packet, can be stored, whereas the reception registering section 32 in the receiving apparatus 31 of the second embodiment of the invention is set to increase the capacity that some reception packets can be stored. The receiving apparatus 31 according to the second embodiment of the invention controls to stop an oscillator, or a clock source, until clock supply to the reception memory section 8 is started.

Also when the receiving apparatus 31 according to the second embodiment of the invention controls the reception memory section 8 to start clock supply only after establishing communication as in the case of the first embodiment of the invention, it takes the oscillator a time to stably oscillate more or less, so that the clock supply cannot be immediately started. The clock supply to the reception memory section 8, therefore, cannot be started in the period until oscillation stabilizes. Accordingly, the data received during this period results in occurring a defective that cannot be stored in the reception memory section 8.

In order to cope with the condition that the defective occurs, considering the maximum communication speed (amount of received data to time) defined in Bluetooth, or a communications protocol, and the time to stabilize oscillation, the received register section 32 is given enough capacity to store the packet to be transmitted by the time that oscillation stabilizes. Depending on the maximum communication speed and the time to stabilize oscillation, the reception registering section 32 stores the packet of the reception data including the payload transmitted following the FHS packet. Accordingly, in the receiving apparatus 31 according to the second embodiment of the invention, it is necessary to comprise that the received data in the reception registering section 32 can be transmitted to the host CPU 2. The receiving apparatus 32, therefore, is set the interval received data bus 22 from the reception registering section 32 to the received data outputting section 9.

Next, as to the receiving operation in the receiving apparatus 31 according to the second embodiment of the invention, the different operation from the receiving apparatus 1 according to the first embodiment of the invention is explained.

The receiving apparatus 31 performs the receiving operation as in the case of steps s1 to s12 in the first embodiment and communication is established. After establishing communication, that is, after receiving the POLL packet in step s12, or properly receiving the FHS packet in step s11 at the earliest, in order that the reception controlling clock 41 is controlled to supply a clock to the reception memory section 8 and the received data outputting section 9, the oscillator is activated. The reception data packet including the payload transmitted following the FHS packet is stored in the reception registering section 32 in a period until the oscillator stably oscillates. When elapsing the period, the oscillator stably oscillates and clock supply to the reception memory 8 and the received data output section 9 starts, then the received data transmitted after elapsing the period is stored in the reception memory section 8.

When the host CPU 2 instructs the receiving apparatus 31 to read the received data after storing the received data in the reception memory section 8, the received data stored in the reception memory section 8 is output to the CPU 2 and one stored in the reception registering section 7 is also output to the host CPU 2 via the internal received data bus 22 and the received data outputting section 9.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A receiving apparatus for receiving and storing a communication packet and outputting the stored packet to a host CPU, comprising:
    a reception circuit for receiving a communication packet;
    a received packet analyzing circuit for analyzing the received packet;
    a reception memory for storing the received packet;
    a reception registering circuit for storing a packet received before a time when a clock is supplied to the reception memory circuit;
    a received data outputting circuit for outputting the received packet stored in the reception registering circuit or the reception memory to the host CPU; and
    a reception clock controlling circuit for controlling clock supply to the reception circuit, the received packet analyzing circuit, the reception memory, the reception registering circuit and the received data output circuit,
    wherein the reception clock controlling circuit stops clock-supply to the reception memory even after the reception circuit receives the packet.

2. The receiving apparatus of claim 1, wherein the received packet analyzing circuit comprises a received address judging circuit for judging whether or not the received packet is destined for the particular receiving apparatus, a received header judging circuit for judging a packet type of the received packet and a reception effective flag judging circuit for judging whether or not the received packet is effective based on an effective flag in the received packet.

3. A receiving apparatus for receiving and storing a communication packet and outputting the stored packet to a host CPU, comprising:
    a reception circuit for receiving a communication packet;
    a received packet analyzing circuit for analyzing the received packet;
    a reception memory for storing the received packet;
    a reception registering circuit for storing a packet received before a time when a clock is supplied to the reception memory circuit;
    a received data outputting circuit for outputting the received packet stored in the reception registering circuit or the reception memory to the host CPU; and
    a reception clock controlling circuit for controlling clock supply to the reception circuit, the received packet analyzing circuit, the reception memory, the reception registering circuit and the received data output circuit,
    wherein the reception clock controlling circuit stops clock-supply to the reception memory even after the reception circuit receives the packet,
    wherein the received packet analyzing circuit comprises a received address judging circuit for judging whether or not the received packet is destined for the particular receiving apparatus, a received header judging circuit for judging a packet type of the received packet and a reception effective flag judging circuit for judging whether or not the received packet is effective based on an effective flag in the received packet, and
    wherein the reception registering circuit has a capacity to store only one received packet of a specific packet type and the reception clock controlling circuit starts clock supply to the reception memory when the packet received by the reception circuit is judged as being destined for the particular receiving apparatus by the received address judging circuit, to be the specific packet type by the received header judging circuit and to be an effective packet by the reception effective flag judging circuit.

4. A receiving apparatus for receiving and storing a communication packet and outputting the stored packet to a host CPU, comprising:
    a reception circuit for receiving a communication packet;
    a received packet analyzing circuit for analyzing the received packet;
    a reception memory for storing the received packet;
    a reception registering circuit for storing a packet received before a time when a clock is supplied to the reception memory circuit;

a received data outputting circuit for outputting the received packet stored in the reception registering circuit or the reception memory to the host CPU; and a reception clock controlling circuit for controlling clock supply to the reception circuit, the received packet analyzing circuit, the reception memory, the reception registering circuit and the received data output circuit, wherein the reception clock controlling circuit stops clock-supply to the reception memory even after the reception circuit receives the packet, wherein the received packet analyzing circuit comprises a received address judging circuit for judging whether or not the received packet is destined for the particular receiving apparatus, a received header judging circuit for judging a packet type of the received packet and a reception effective flag judging circuit for judging whether or not the received packet is effective based on an effective flag in the received packet, and wherein the reception registering circuit has a capacity to store a plurality of received packets of any packet type, and the reception clock controlling circuit starts clock supply to the reception memory when the packet received by the reception circuit is judged by the received address judging circuit as being destined for the particular receiving apparatus, by the received header judging circuit as being of a packet type in which packet a payload or actual data exists, and by the reception effective flag judging circuit as being an effective packet.

5. The receiving apparatus of claim 1, wherein the received data outputting circuit outputs the received packet stored in the reception registering circuit or the reception memory when the host CPU requests to read the received packet stored in the received register circuit or the reception memory.

6. A receiver comprising:
a receiver circuit for receiving packets communicated to the receiver from a transmitter;
a packet analyzing circuit for analyzing the received packets;
a reception memory for storing one or more of the received packets when a clock signal is supplied thereto;
a reception registering circuit for storing one of the received packets before the clock signal is supplied to the reception memory;
an output circuit; and
a clock control section for supplying the clock signal to the reception memory only after the packet analyzing means determines that the packet stored in the reception registering circuit satisfies one or more criteria.

7. The receiver of claim 6, wherein the output circuit selectively outputs received packets from either the reception memory or the reception registering circuit.

8. The receiver of claim 6, wherein the reception registering circuit has a one-packet capacity.

9. The receiver of claim 6, wherein the reception registering circuit has a multiple-packet capacity.

10. The receiver of claim 9, wherein the multiple-packet capacity of the reception registering circuit is determined in accordance with a stabilization time for an oscillator for generating the clock signal supplied to the reception memory.

11. The receiver of claim 6, wherein the reception memory comprises a semiconductor memory having a large-scale circuit.

12. The receiver of claim 6, wherein the packets are communicated according to the Bluetooth protocol.

13. The receiver of claim 6, wherein the one or more criteria comprise error criteria for determining presence/absence of errors in the packet stored in the reception registering circuit.

14. The receiver of claim 6, wherein the reception registering circuit stores the packet in the reception registering circuit when the packet analyzing circuit determines that the packet satisfies one or more other criteria.

15. The receiver of claim 14, wherein the one or more other criteria include address criteria and packet type criteria.

16. The receiver of claim 14, wherein the clock control section supplies a clock signal to the reception registering circuit only after the packet analyzing circuit determines that the packet satisfies the one or more other criteria.

* * * * *